Sept. 11, 1934.   C. S. ASH   1,973,161
WHEEL
Filed Feb. 8, 1929   2 Sheets-Sheet 1
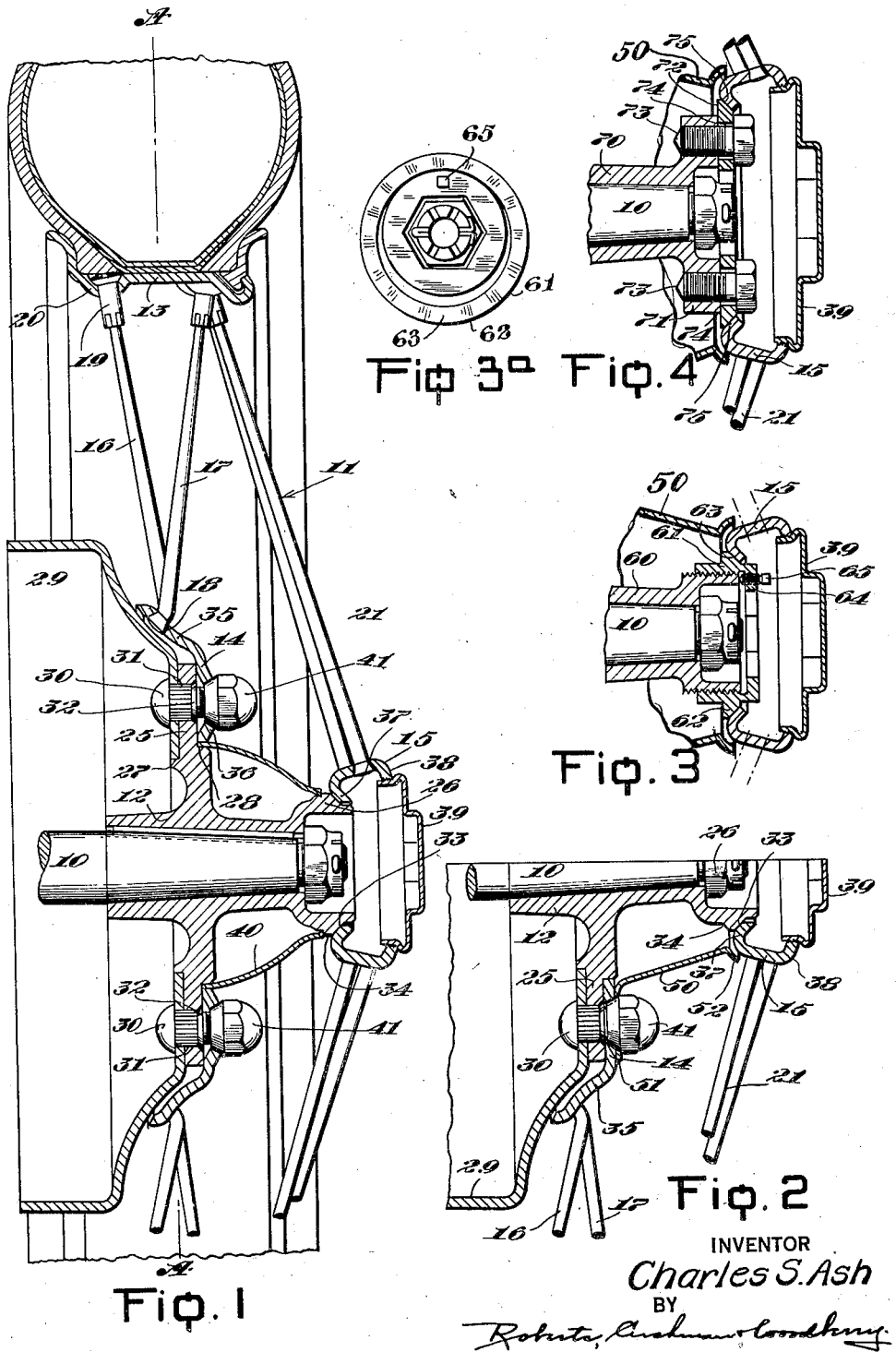
INVENTOR
Charles S. Ash
BY
Roberts, Cushman Woodbury
ATTORNEY

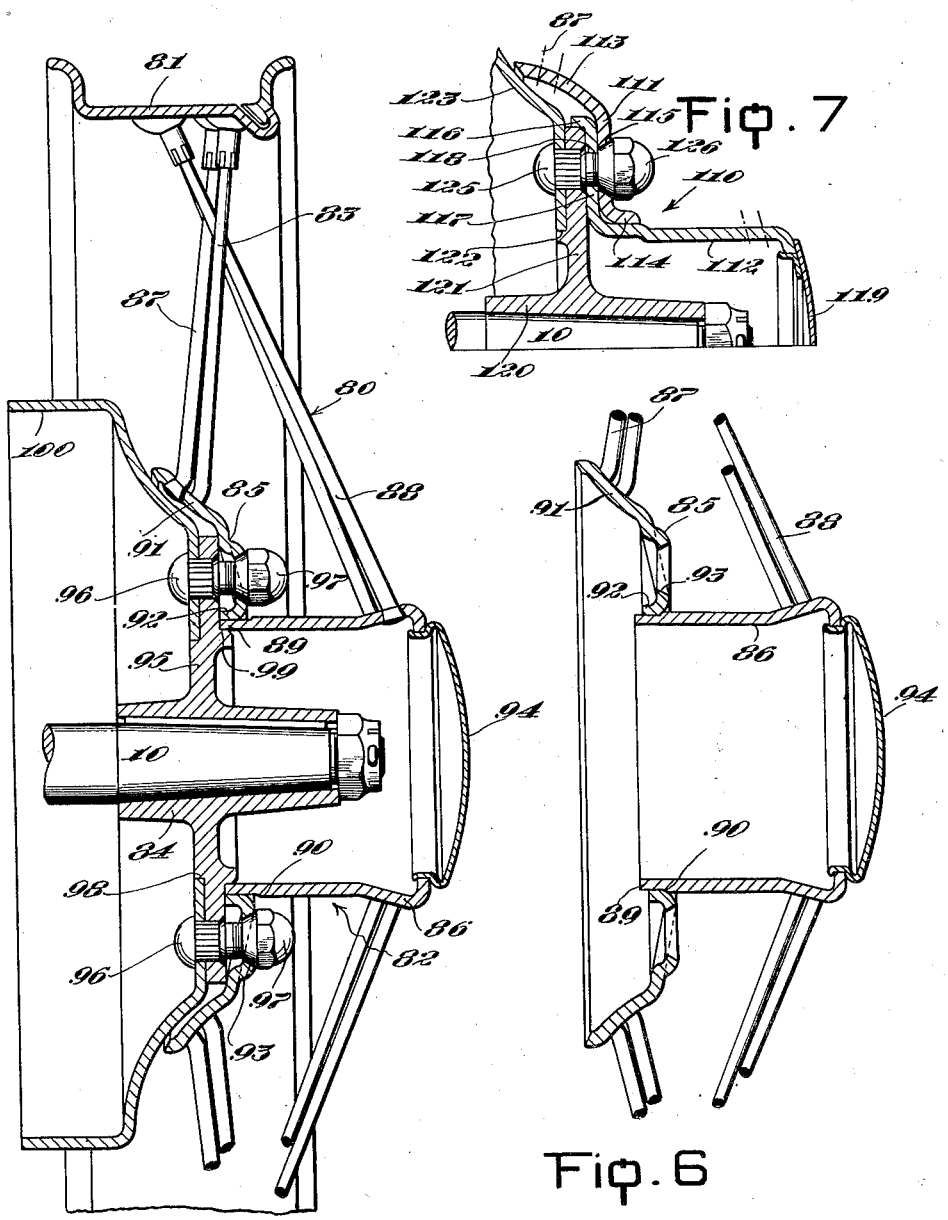

Patented Sept. 11, 1934

1,973,161

UNITED STATES PATENT OFFICE 1,973,161

WHEEL

Charles S. Ash, Royal Oak, Mich., assignor to Kelsey-Hayes Wheel Corporation, Detroit, Mich., a corporation of New York Application February 8, 1929, Serial No. 338,525

8 Claims. (Cl. 301—9)

This invention relates to an improvement in wheels, and more particularly in wheels of the wire spoke type, which customarily include a rim, a plurality of spokes, and a hub engaging member in the form of a hub shell, the spokes connecting the rim to the hub shell and being attached to the hub shell at the ends thereof. Such wheels are adapted to be mounted upon hubs, the hub shell surrounding the hub and being removably secured thereto.

The primary object of this invention is to provide a wheel of the wire spoke type in which there is substituted for the hub shell to which the inner ends of the spokes are attached a hub engaging member consisting of a pair of continuous rings or bands which are capable of axial movement toward each other when in other than the functioning position, in other words, except when the wheel is mounted upon a hub.

A further object of this invention is to provide means for adjusting the location on the hub of one of the spoke carrying bands relative to the other band or to the rim in order to secure proper tensioning of the spokes.

Other objects will appear from the following specification taken in connection with the drawings which form a part thereof and in which Fig. 1 is a sectional view of a wheel embodying one form of this invention mounted upon a hub;

Fig. 2 is a partial sectional view of another embodiment of this invention similarly mounted;

Figs. 3 and 4 are sectional views illustrating means for so mounting the outer band upon the hub that its location relative to the inner band or to the wheel rim may be adjusted as desired;

Fig. 3<sup>a</sup> is a face view of the mounting means of Fig. 3;

Fig. 5 is a view similar to Fig. 1 of another embodiment of this invention;

Fig. 6 is a sectional view of the central portion of the wheel shown in Fig. 5 demounted from a hub; and Fig. 7 is a partial sectional view of another embodiment of the invention mounted upon a hub.

The wheels of the various embodiments shown each comprise a rim which is adapted to receive a tire in the usual way, shown only in Fig. 1, a hub engaging member consisting of a pair of bands, and a plurality of spokes which connect the rim to the hub engaging member. The wheel is mounted upon a hub having an inner flange from which project outwardly a plurality of bolts. In accordance with the usual custom, the bolts are arranged in a circle and are provided with nuts which act upon the hub engaging member to secure the wheel in place upon the inner hub.

The hubs here illustrated are driving hubs keyed upon the end of a driving axle 10 but it will be readily understood by those skilled in the art that hubs of the type to be mounted upon steering non-driving or dummy hubs for spare wheels could have been disclosed if desired. Thus the illustration of driving hub constructions only can not be considered as in any way limiting the invention thereto.

The embodiment shown in Fig. 1 consists of a wheel 11 mounted upon a hub 12 carried by the axle 10. The wheel 11 comprises a rim 13 and a hub engaging member consisting of a pair of bands 14 and 15 laced to the rim by spokes. The rim 13 is connected to the inner band 14 by two rows of spokes 16 and 17, the row 16 being the inner row and the row 17 being the center row. The spokes pass through holes 18 in the band 14 and are attached to the rim by means of nipples 19 seated in depressions 20 in the base of the rim 13. The spokes 16 and 17 are substantially of the same length and, being on opposite sides of the center plane A—A of the wheel, support the band 14 substantially in such center plane whether the wheel be mounted upon or demounted from the hub. The rim is laced to the outer band 15 by spokes 21 which constitute the outer row, such spokes being shown attached to the band 15 and rim 13 in the manner described with reference to the spokes 16 and 17. The spokes may be attached to the bands and rim in other ways as by welding or riveting if desired.

The hub 12 is provided with an inner annular flange 25 and an outer flange or sleeve 26. The faces of the flange 25 are cut away to provide annular shoulders 27, 28. The inner shoulder 27 receives the edge of a brake drum 29 which is rigidly secured to the flange 25 by a series of bolts 30. Such bolts 30 may be provided with longitudinal corrugations which bear against the walls defining apertures 31 in the flange 25 through which the bolts are driven. The surface of the bolts may be upset at 32 to insure the securement of the brake drum 29 in place. The outer flange 26 is provided with an annular inclined seat 33 and an inner depression or groove 34.

The inner band 14 includes a rearwardly extending flange 35 in which the holes 18 are formed and is provided with a series of holes 36 through which the bolts 30 pass when the wheel is mounted upon the hub as will be described below. The outer band 15 is approximately U-shaped in cross section having an inner flange 37 and an outer flange 38. The inner flange is so formed as to rest against the seat 33 when the wheel is mounted upon the inner hub. A cap 39 is suitably secured to the flange 38 to form a finish to that portion of the wheel and to protect the axle from dust, grit or other deleterious matter. The cap 39 is here shown as threaded into engagement with the flange 38. The portion of the hub 12 between the flanges 25 and 26 may, if desired, be concealed by a shell or sleeve 40 which rests upon the shoulder 28 of the flange 25 and enters the depression or groove 34. The sleeve 40 is secured to the flange 25 by welding, or other means may be employed.

When mounting the wheel upon the hub the outer band 15 bears against the seat 33 of the flange 26 and the inner band 14 is clamped against the flange 25 by nuts 41 which engage the outer ends of the bolts 30 projecting through the holes 36.

It will be noted that when the wheel is demounted the bands 14 and 15 may approach each other axially. The outer band 15 is particularly adapted to such movement due to the fact that it is supported by one row of spokes only while the inner band is, as pointed out above, supported by two rows of spokes at an angle to each other. The wheel is so built and the seat 33 is so spaced relative to the flange 25 that when the wheel is mounted upon the hub the spokes are all under tension. This is true regardless of the number of times the tension is released by demounting the wheel.

The embodiment shown in Fig. 2 differs from that shown in Fig. 1 with respect only to the sleeve which covers the portion of the hub between the inner and outer flanges. The common features are designated by the same reference numerals and will not be described in detail. In place of the sleeve 40 secured to the hub flange 25 there is provided a sleeve 50 having an inner flange 51 and an outer flange 52. The sleeve 50 is attached to the band 14 by means of the flange 51 so that it is removed with the wheel from the hub. The flange 52 on the sleeve is spaced from the band 15 when the wheel is mounted. It is apparent however that when the wheel is demounted the band 15 will approach the flange 52 which thus functions as a stop to fix the minimum distance between the bands.

Conditions sometimes arise when the tension of the spokes is uneven around the hub and in order to correct these conditions the constructions shown in Fig. 3 or Fig. 4 may be employed. Both constructions permit an adjustment of the outer band relative to the rim but the Fig. 3 construction also permits an adjustment of the outer band relative to the inner band.

In Fig. 3 the hub 60 carries at its outer end a flange upon which a collar 61 is threadedly mounted. The collar 61 has on its outer surface a peripheral boss 62 provided with an inclined seat 63 which corresponds to the seat 33 on the hub 13 of the embodiments previously described and which receives the band 15 when the wheel is mounted upon the inner hub 60. The boss 62 is eccentrically formed and obviously by rotating the collar 61 the relation of the band 15 to the rim and to the band 14 is adjusted so that the tension of the spokes can be altered as desired. Thus the distance between the bands can be set to put the spokes under proper tension by spacing the inner ends of the spokes and also the tension of the spokes in the outer row can be altered by adjusting the band 15 relative to the hub. The collar 61 has at its outer end an inwardly projecting flange 64 through which passes a set screw 65 so arranged that its inner end bears against the outer end of the hub. By tightening the set screw the collar, having been properly adjusted, will be held against any rotative inward movement on the boss 62.

In Fig. 4 the hub 70 terminates in a flange 71 to the outer face of which an annular plate 72 is secured by bolts 73 which pass through slots 74 in the plate. The periphery of the plate is faced off to provide a seat 75 which corresponds to the seats 33 and 63 previously described and which receives the band 15. Obviously by loosening the bolts 73 and shifting the plate 72 the band 15 will be set in suitable relation to the hub and any variance in tension of the spokes in the outer row may be corrected.

The embodiment shown in Figs. 5 and 6 consists of a wheel 80 comprising a rim 81, a hub engaging member 82 and a plurality of spokes 83 and a hub 84. The hub member 82 consists of an inner band 85 and an outer band 86. The inner band 85 is laced to the rim by a single row of spokes 87 extending to the outer portion of the rim and the outer band 86 is laced to the rim by a single row of spokes 88 extending to a portion of the rim inside the spokes 87. These bands 85 and 86 correspond in function to the bands 14 and 15 in the other embodiments, but the band 86 is elongated axially so that its rear edge 89 enters the band 85 and is preferably faced off adjacent the rear edge to provide a shoulder 90. The band 85 has a rearwardly inclined flange 91 to which the spokes 87 are attached, and terminates at its inner periphery in a flange 92 which as described above receives the rear edge 89 of the band 86. Through the band 85 are formed a plurality of holes 93 for a purpose to be described later. The mouth of the band 86 is closed by a suitably formed and mounted cap 94.

The hub 84 is provided with an inner flange 95 from which project a plurality of bolts 96 suitably arranged in a circle and adapted at their outer ends to receive nuts 97. The flange 95 has shoulders 98 and 99 upon its inner and outer faces. The shoulder 98 serves as land for a brake drum 100 attached to the flange 95 by the bolts 96 which bolts are preferably similar to the bolts 30 previously described, and rigidly hold the drum in place.

When the wheel is demounted it will take the position shown in Fig. 6, the shoulder 90 of the band 86 resting against the band 85 and the rear edge 89 of the band projecting beyond the inner face of the flange 92. Upon mounting the wheel upon the hub 84 the rear edge of the band 86 will rest upon the shoulder 99 and the bolts 96 will pass through the holes 93. Upon applying and tightening the nuts 97 the band 85 will be drawn away from the shoulder 90 and clamped against the flange 95 thus placing the spokes under the proper tension.

The embodiment shown in Fig. 7 follows in general structure and function the wheel shown in Figs. 5 and 6 but differs therefrom in certain details of construction. The hub engaging member 110 of this wheel comprises an inner band 111 and an outer band 112. The inner band 111 has a rearwardly inclined flange 113 to which the spokes 87 are secured and has a flange 114 projecting outwardly from the inner periphery, while through the body portion of the band 111 are provided a plurality of holes 115. The outer band 112 is extended rearwardly and then outwardly at right angles thereto terminating in a rearwardly extending flange 116. The outwardly extending portion 117 is provided with a plurality of holes 118 which correspond to the holes 115 in the band 111. The portion 117 of the band 112 extends behind the band 111 so that the latter rests upon the band 112. The mouth of the band 112 is closed by a cap 119 which may be secured in place in any desired manner.

The wheel is intended to be mounted upon a hub 120 having an annular flange 121. A shoulder 122 on the inner face of the flange 121 serves as a band for a brake drum 123 which is rigidly secured to the flange 121 by a series of bolts 125 similar in all respects to the bolts 30 and 96 and provided with nuts 126.

When demounted the band 111 is free to slip outwardly over the band 112 or the band 112 may slip inwardly through the band 111. Upon mounting the wheel the flange 116 lands upon the periphery of the flange 121 and the bolts 125 project through the holes 118 in the outer band and the holes 115 in the inner band. The tightening of the nuts 126 forces the band 111 into contact with the portion 117 of the band 112 and clamps both members against the flange 121.

It will be noted that in the embodiments last described the bands overlap in a slip joint connection and that the outer band has a positive land upon the flange of the hub so that the hub is concealed by the outer band 112.

Each of the various embodiments includes a pair of bands which are independently connected to the rim and which engage a hub having an inner flange. Furthermore the wheel is attached to the hub by a series of bolt and nut assemblies which rigidly secure the inner band to the hub flange. Other embodiments including these features could be made without departing from the spirit and scope of this invention as set forth in the following claims and it will be understood that applicant is not limited to the particular embodiments shown.

I claim:

1. The combination with a hub having an inner and an outer portion, of a wheel adapted to be mounted upon said hub and comprising a rim, a hub engaging member consisting of a pair of bands, and means connecting the bands independently to the rim, an abutment member adjustably attached to the outer portion of the hub, one of said bands engaging the inner portion and the other band engaging the abutment member, and means removably securing the band to the inner portion of the hub without disturbing the latter, said means constituting the sole means for detachably securing the wheel to the hub, the abutment member being radially adjustable to alter the relation of the band engaging the member to the rim.

2. The combination with a hub having an inner and an outer flange, of a wheel adapted to be mounted upon said hub and comprising a rim, a hub engaging member consisting of a pair of bands, and means connecting the bands independently to the rim, an abutment member rotatably and axially adjustably attached to the outer flange of the hub and having an eccentric seat, one of said bands engaging the inner flange and the other band engaging the seat of the abutment member, and means removably securing the band to the front side of the inner flange of the hub, said means constituting the sole means for detachably securing the wheel to the hub, said abutment member being adjustable to alter the relation of the band engaging the seat to the rim and the other band.

3. A wheel adapted to be mounted upon a hub and comprising a rim, a hub engaging member, said member consisting of a pair of separate bands adapted to be individually mounted upon said hub and when demounted from the hub being capable of movement axially relative to each other, means for connecting each band independently to said rim, means for limiting the relative movement of the bands toward each other when demounted from the hub, and means for detachably securing the hub engaging member to the hub, the securing means engaging one only of the bands and causing relative movement of the bands during the mounting.

4. A wheel adapted to be mounted upon a hub and comprising a rim, a hub engaging member, said member consisting of a pair of separate bands adapted to be individually mounted upon said hub and when demounted from the hub being capable of movement axially relative to each other, means for connecting each band independently to said rim, means carried by one of said bands for engaging the other band and thereby limiting the relative movement of the bands toward each other when demounted from the hub, and means for detachably securing the hub engaging member to the hub, the securing means engaging one only of the bands and causing relative movement of the bands during the mounting.

5. A demountable tension spoke wheel comprising hub parts relatively axially movable, rows of spokes anchored respectively to different hub parts, a radial wheel supporting flange commonly bearing both hub parts on its face, and means connected with the flange axially to separate the hub parts to tension the spokes.

6. A demountable tension spoke wheel comprising telescoping annular hub shell portions, rows of spokes anchored in respective telescoping portions, a supporting hub and hub attaching bolts operative in the attachment of the wheel to extend the telescoping relation of the parts to tension the spokes.

7. The combination with a flanged hub of a wheel adapted to be mounted upon said hub and comprising a rim, a hub engaging member consisting of a pair of bands having a slip joint connection with each other providing for relative movement of said bands during the attachment of said wheel to said hub, means connecting said bands independently to said rim, and means removably securing the inner band to the flange, the outer band also engaging the flange and being secured in place by the securement of the inner band to the flange.

8. A demountable wheel, comprising relatively axially movable telescoping annular hub portions, a rim member, a supporting hub member having a flange commonly bearing both hub portions on its face, means connecting said hub portions independently to said rim member, means carried by one of said hub portions for engaging the other of said hub portions and thereby limiting relative axial movement of said hub portions toward each other when demounted from said supporting hub, and securing means engageable with said supporting hub and with one of said hub portions and operative in the attachment of the wheel to extend the telescoping relation of said hub portions to tension said connecting means.

CHARLES S. ASH.